(12) United States Patent
Oda et al.

(10) Patent No.: US 6,986,260 B2
(45) Date of Patent: Jan. 17, 2006

(54) ELECTRICAL FAN SYSTEM FOR VEHICLE

(75) Inventors: Shinichi Oda, Okazaki (JP); Kuzuhiro Takeuchi, Okazaki (JP); Tatsuhiro Matsuki, Obu (JP); Takaaki Muramatsu, Hamamatsu (JP)

(73) Assignees: DENSO Corporation, Kariya (JP); Asmo Co., Ltd., Kosai (JP)

( * ) Notice: Subject to any disclaimer, the term of this patent is extended or adjusted under 35 U.S.C. 154(b) by 17 days.

(21) Appl. No.: 10/887,179

(22) Filed: Jul. 8, 2004

(65) Prior Publication Data
US 2005/0005620 A1   Jan. 13, 2005

(30) Foreign Application Priority Data
Jul. 11, 2003    (JP) .............................. 2003-273458

(51) Int. Cl.
*F25D 17/00*   (2006.01)
(52) U.S. Cl. ................... 62/179; 181/183; 181/184
(58) Field of Classification Search ................. 62/179, 62/181, 183, 184; 123/41.11, 41, 41.49
See application file for complete search history.

(56) References Cited

U.S. PATENT DOCUMENTS

| | | | | |
|---|---|---|---|---|
| 4,590,772 A | * | 5/1986 | Nose et al. .................... | 62/184 |
| 4,651,922 A | * | 3/1987 | Noba ............................ | 236/35 |
| 4,658,595 A | | 4/1987 | Shimada et al. | |
| 5,014,519 A | * | 5/1991 | Noji et al. ................... | 62/176.3 |
| 5,072,597 A | * | 12/1991 | Bromley et al. .............. | 62/209 |
| 5,623,835 A | * | 4/1997 | Layman et al. ............... | 62/133 |
| 5,799,867 A | * | 9/1998 | Misawa ....................... | 237/2 B |
| 5,947,189 A | * | 9/1999 | Takeuchi et al. .............. | 165/51 |
| 6,199,398 B1 | * | 3/2001 | Takeuchi et al. ........... | 62/323.1 |
| 6,415,746 B2 | * | 7/2002 | Kobayashi et al. ....... | 123/41.12 |
| 6,467,286 B2 | * | 10/2002 | Hasebe et al. ................ | 62/185 |
| 6,747,432 B2 | * | 6/2004 | Yoshimura .................. | 318/599 |
| 6,802,185 B2 | * | 10/2004 | Furukawa et al. ............. | 62/89 |
| 6,883,589 B2 | * | 4/2005 | Ozawa et al. ................. | 165/41 |
| 2002/0195069 A1 | | 12/2002 | Herke et al. | |

FOREIGN PATENT DOCUMENTS

| | | |
|---|---|---|
| DE | 102 57 642 | 7/2004 |
| EP | 1 154 132 | 11/2001 |
| JP | 58-67919 A * | 4/1983 |
| JP | 2002-4860 A * | 1/2002 |

OTHER PUBLICATIONS

European Search Report dated Aug. 19, 2004 in corresponding European Application No.04 01 6094.

* cited by examiner

*Primary Examiner*—Mohammad M. Ali
(74) *Attorney, Agent, or Firm*—Harness, Dickey & Pierce, PLC

(57) ABSTRACT

An electric fan system has a first electric blower 10, which utilizes a brushless motor, and a second electric blower, which utilizes a brushed motor, for distributing the cooling air to the radiator and the condenser. The system has an electronic engine control unit which activates only the first electric blower when it determines that the cooling water temperature is less than T2, and activates both the first and second electric blowers when it determines that the cooling water temperature is T2 or higher. The water temperature is based on a detection output from a cooling water temperature sensor. Thus, since the electric blower is not activated unless the cooling water temperature becomes T2 or higher, use of the brushed motor is limited and its life is increased.

6 Claims, 7 Drawing Sheets

ELECTRICAL FAN SYSTEM FOR VEHICLE

CROSS REFERENCE TO RELATED APPLICATIONS

This application is based upon, claims the benefit of priority of, and incorporates by reference Japanese Patent Application No. 2003-273458 filed Jul. 11, 2003.

FIELD OF THE INVENTION

The present invention relates to a vehicular electric fan system for blowing cooling air with an electric blower.

BACKGROUND OF THE INVENTION

Conventionally, a vehicular electric fan system has been known that is designed to use an electric blower to distribute cooling air to a radiator for cooling water to cool an engine. The system also distributes cooling air to a vehicular air conditioning condenser (heat dissipater) for cooling the radiator and the condenser.

Suppose a case where such an electric fan system for a vehicle is applied to automobiles such as taxis or official cars which frequently use the electric fan system. In this case, it has been a general practice to employ an electric motor with a large electrical capacity and having an electric blower. It has also been the general practice to operate this electric motor using less than the rated electrical capacity to minimize deterioration of the electric motor to increase the life of the electric motor. However, the employment of such electric motor having large rated capacity may entail not only an increase in costs but also an increase in weight.

A brushless motor may also be employed as the electric motor for an electric blower for the purpose of increasing the life of the electric motor. As shown in FIG. 8, however, if the dimension of the radiator in the direction of vehicle width (lateral direction of the vehicle) is larger than the dimension of the electric blower impeller in the direction of vehicle width, a single electric blower will not be sufficient and will cause poor distribution of air blown to the radiator. This situation may leave some parts of the radiator not supplied with cooling air. Consequently, the cooling efficiency of the radiator will be decreased and hence the fuel economy also will be decreased.

If two or more electric blowers using a brushless motor are employed for solving the above-mentioned problem, it will be possible to optimize the distribution of air blown to the radiator and to supply the radiator with a sufficient amount of cooling air. However, this arrangement will require a control circuit with complex construction for controlling the brushless motors and, moreover, if two or more electric blowers having a brushless motor are employed, it will remarkably increase costs.

In view of the above-mentioned circumstances, the present invention has an object to provide an electric fan system for a vehicle which is capable of increasing the life without increasing the costs.

SUMMARY OF THE INVENTION

In order to achieve the above-mentioned object, according to a first aspect of the teachings, an electric fan system for a vehicle distributes cooling air to a radiator (100) for cooling cooling water circulated within a vehicular water-cooled engine, and to a heat dissipater (110) for cooling a refrigerant circulated within a refrigeration cycle device. The electric fan system has: a first electric blower (10) for distributing the cooling air to the radiator and the heat dissipater by using a brushless motor (12), a second electric blower (20) for distributing the cooling air to the radiator and the heat dissipater by using a motor with brushes, that is, a brushed motor (22), and a control unit (40).

The control unit (40) activates only the first electric blower when the control unit determines that a temperature of the cooling water is less than a predetermined value. The control unit (40) activates both the first and second electric blowers when the control unit determines that the temperature of the cooling water is equal to or more than the predetermined value, on the basis of detection output from a temperature sensor (125) for detecting a temperature of the cooling water.

According to this construction, the second electric blower is not activated unless the temperature of the cooling water becomes a predetermined value or higher, and hence the operating rate of the brushed motor can be reduced to reduce wear on the motor with brushes. The life of the motor with brushes thus can be increased and therefore it is possible to increase the life of the first electric blower and that of the entire vehicular electric fan system. Since a motor with brushes is employed in the second electric blower whereas a brushless motor is employed in the first electric blower, the increase of costs can be kept lower than a case in which both the first and second blowers employ a brushless motor. In this manner, it is possible to increase the life while suppressing any increase in costs.

According to a second aspect of the teachings, a vehicular electric fan system distributes cooling air to a radiator (100) for cooling cooling water circulated in a vehicular water-cooled engine (135) and to a heat dissipater (110) for cooling a refrigerant circulated in a refrigeration cycle device. The electric fan system may have: a first electric blower (10) for distributing the cooling air to the radiator and the heat dissipater by using a brushless motor (12), a second electric blower (20) for distributing the cooling air to the radiator and the heat dissipater by using a motor (22) having brushes, and a control unit (40). The control unit (40) activates only the first electric blower when it determines that an increasing rate of the temperature of the cooling water is less than a predetermined value, but activates both the first and second electric blowers when it determines that the increasing rate of the temperature of the cooling water is equal to or more than the predetermined value. These determinations are made on the basis of detection output from a temperature sensor (125) that detects the temperature of the cooling water.

According to this construction, the second electric blower is not activated unless the increase rate of the temperature of the cooling water becomes a predetermined value or higher, and hence the operating rate of the brushed motor can be reduced to reduce wear and tear on the brushed motor. The life of the brushed motor thus can be increased and therefore it is possible to increase the life of the first electric blower and hence of the electric fan system for a vehicle. Further, since a brushed motor is employed in the second electric blower whereas a brushless motor is employed in the first electric blower, the increase of costs can be kept lower than a case in which both the first and second blowers use a brushless motor.

According to a third aspect of the teachings, an electric fan system for a vehicle distributes cooling air to a radiator (100) for cooling cooling water circulated in a vehicular water-cooled engine (135) and to a heat dissipater (110) for cooling a refrigerant circulated in a refrigeration cycle device. The electric fan system may have: a first electric blower (10) for distributing the cooling air to the radiator and the heat dissipater by using a brushless motor (12); a second electric blower (20) for distributing the cooling air to the radiator and the heat dissipater by using a brushed motor (22); and a control unit (40) which activates only the first electric blower when it determines that the pressure of the refrigerant is less than a predetermined value. The control unit (40) activates both the first and second electric blowers when it determines that the pressure of the refrigerant is equal to or more than the predetermined value. The activation of the control unit (40) is made on the basis of a detection output from a pressure sensor (130) for detecting the pressure of the refrigerant in the heat dissipater.

According to this constitution, the second electric blower is not activated unless the pressure of refrigerant equals a predetermined or higher value, and hence the operating rate of the brushed motor can be reduced to reduce wear and tear on the brushed motor. The life of the brushed motor thus can be increased and therefore it is possible to increase the life of the first electric blower and hence of the electric fan system for a vehicle. Further, since a brushed motor is employed in the second electric blower whereas a brushless motor is employed in the first electric blower, the increase of costs can be kept lower than a case when both the first and second blowers use a brushless motor.

According to a fourth aspect of the teachings an electric fan system for a vehicle distributes cooling air to a radiator (100) for cooling cooling water circulated in a vehicular water-cooled engine (135) and to a heat dissipater (110) for cooling a refrigerant circulated in a refrigeration cycle device. The electric fan system may have: a first electric blower (10) for distributing the cooling air to the radiator and the heat dissipater by using a brushless motor (12), a second electric blower (20) for distributing the cooling air to the radiator and the heat dissipater by using a brushed motor (22), and a control unit (40).

The control unit (40) activates only the first electric blower when it determines that an increasing rate of a refrigerant pressure is less than a predetermined value, and activates both the first and second electric blowers when it determines that the increase rate of the pressure of the refrigerant is equal to or more than the predetermined value. The activation of the control unit (40) is made on the basis of a detection output from a pressure sensor (130) for detecting the pressure of the refrigerant in the heat dissipater.

According to this constitution, the second electric blower is not activated unless the increasing rate of the refrigerant pressure becomes a predetermined value or higher, and hence the operating rate of the brushed motor can be suppressed to reduce wear and tear on the brushed motor. The life of the brushed motor thus can be increased and therefore it is possible to increase the life of the first electric blower and hence of the electric fan system for a vehicle.

Further, since a brushed motor is employed in the second electric blower whereas a brushless motor is employed in the first electric blower, the increase of costs can be kept lower than a case when both the first and second blowers use a brushless motor.

According to a fifth aspect of the teachings, the control unit (40) activates only the first electric blower when it determines that the temperature of the cooling water detected by the temperature sensor (125) is equal to or more than a predetermined value, and that a vehicle speed detected by a vehicle speed sensor is equal to or more than a specified value.

Further, the sixth aspect teachings are characterized in that the control unit (40) activates only the first electric blower when it determines that the pressure of the refrigerant in the heat dissipater is equal to or more than a predetermined value, and that a vehicle speed detected by a vehicle speed sensor is equal to or more than a specified value. Here, according to the fifth and sixth aspects of the teachings, the heat exchanger can be cooled by air that is taken in when the vehicle is moving if the vehicle speed is a specified value or higher, and hence sufficient cooling capability can be ensured without operating the brushed motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
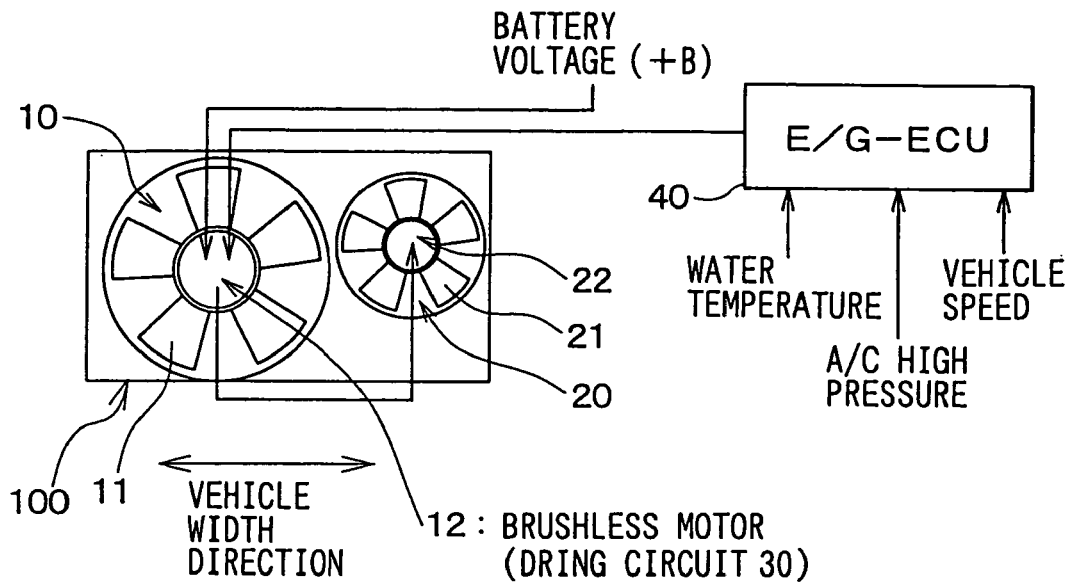
FIG. 1 is a schematic view of an electric fan system for a vehicle according to a preferred embodiment of the present invention.
Figure 2:
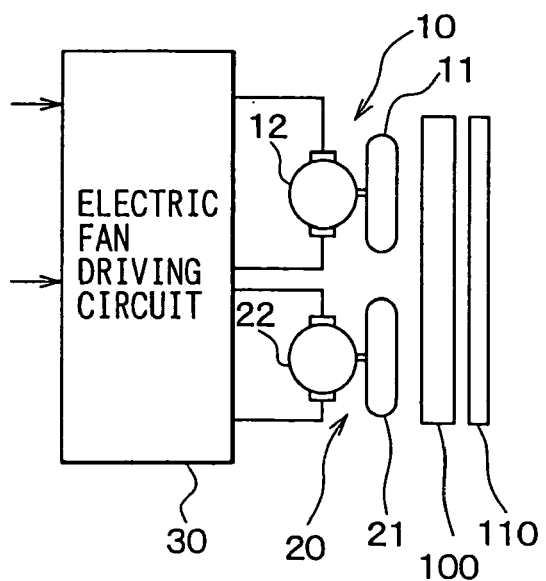
FIG. 2 is a view showing an arrangement of a radiator and a condenser associated with the electric fan system of FIG. 1.
Figure 10:
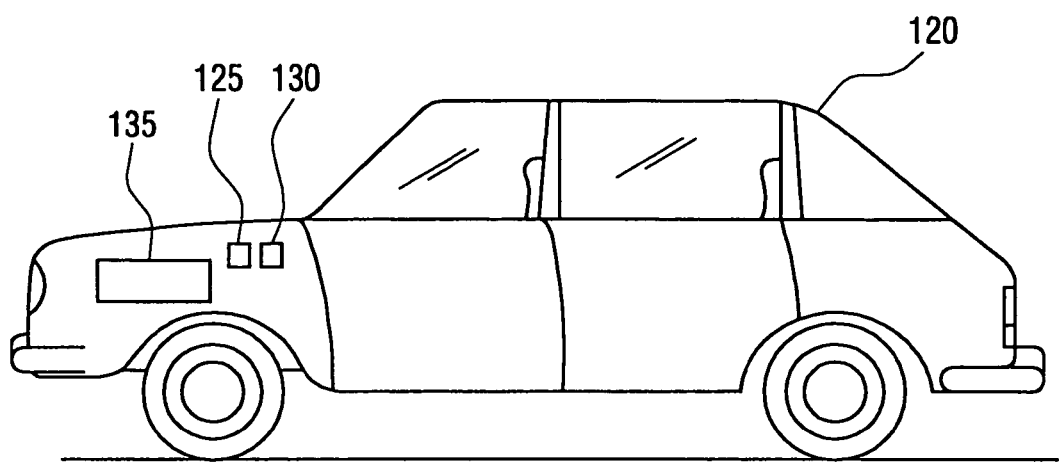
FIG. 10 is an automobile into which the electric fan system may be installed.

FIGS. 1 through 4 depict configurations of an electric fan system for a vehicle 120 (FIG. 10) according to a first preferred embodiment of the present invention. FIGS. 1 and 2 are schematic views showing the configuration of the electric fan system for a vehicle. The electric fan system for a vehicle has, as shown in FIG. 1, electric blowers 10, 20 within the engine compartment of a vehicle. The electric blower 10 has an impeller 11 and a brushless motor 12 for rotationally driving the impeller 11, and the electric blower 20 has an impeller 21 and a brushed motor (direct-current "DC" motor) 22 for rotationally driving the impeller 21. Here, the electric blowers 10, 20 serve to distribute cooling air to a radiator 100 and a condenser 110 for cooling the radiator 100 and the condenser 110.

The radiator 100 and the condenser 110 are disposed within the engine compartment along the longitudinal direction of the vehicle. The radiator 100 cools cooling water (engine cooling water) circulated within the vehicle's water-cooled engine 135. The condenser 110 is one of the constitutional elements of an automobile air conditioner (refrigeration cycle device) for air-conditioning the cabin with the use of the refrigerating cycle, and cools the refrigerant circulated within the automobile air conditioner.

Figure 3:
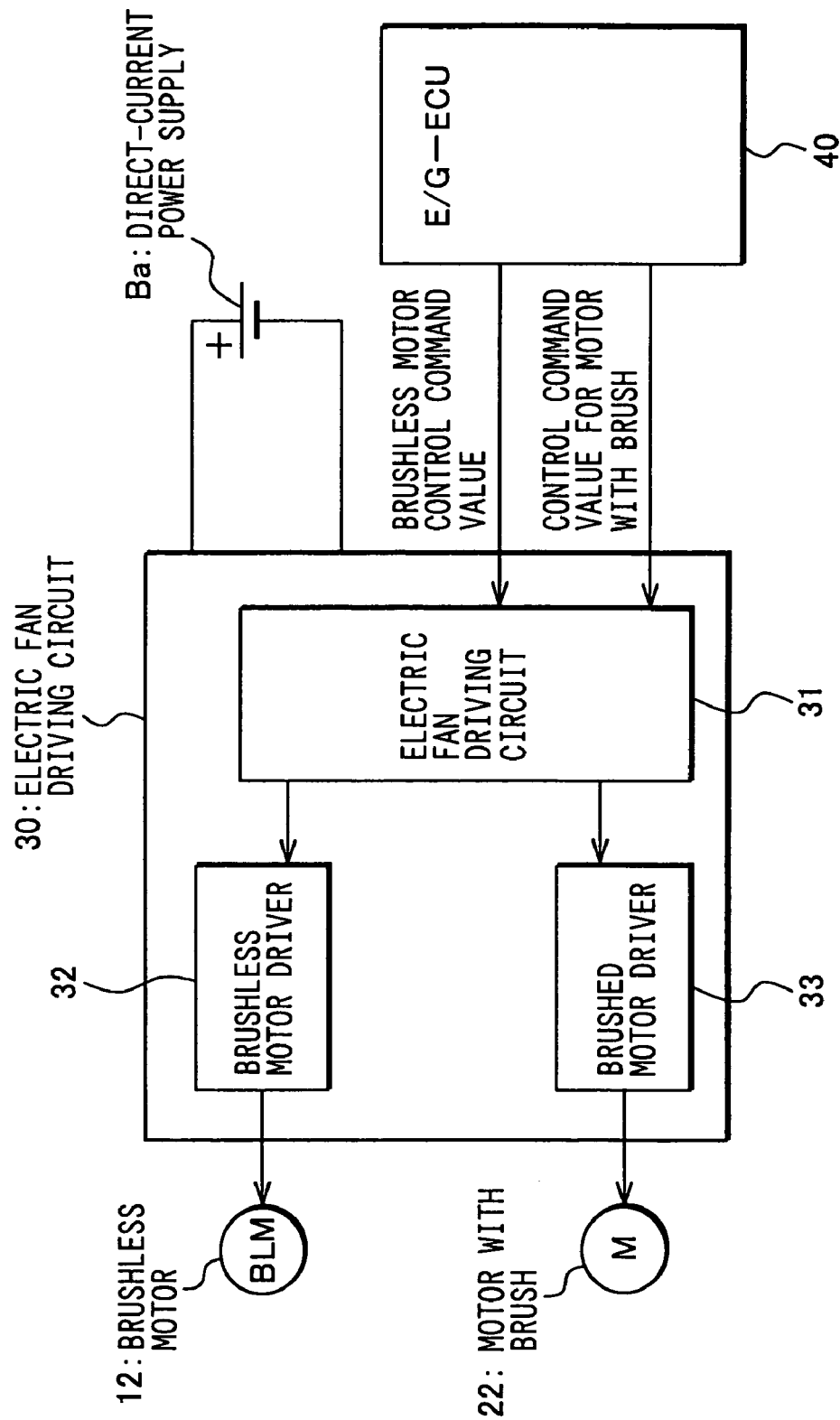
FIG. 3 is a block diagram showing the electric configuration of the electric fan system of FIG. 1.
Figure 4:
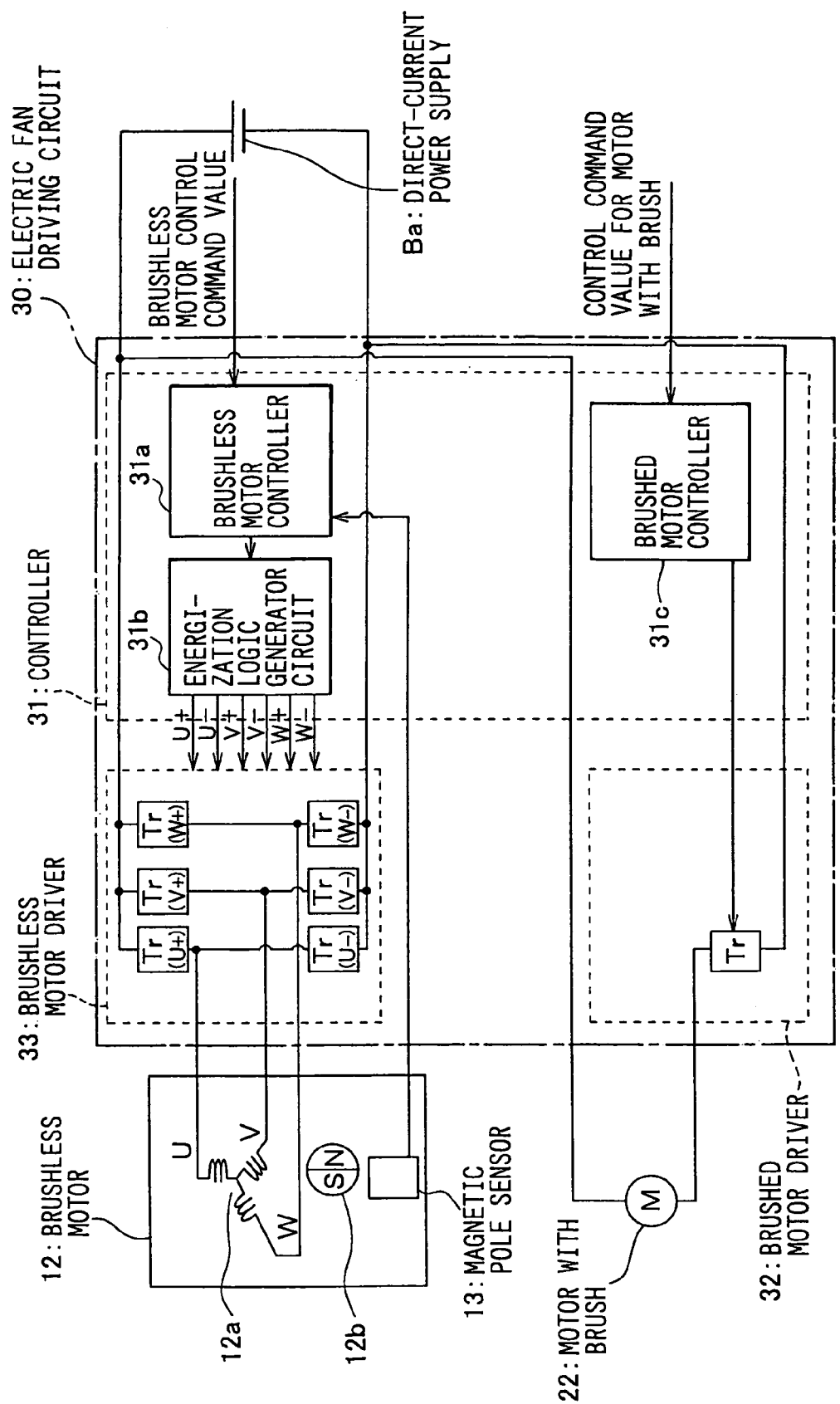
FIG. 4 is a block diagram of the electric configuration of an electric fan driving circuit for the electric fan system of FIG. 1.

Next, the schematic electrical configuration of the electrical fan system according to the first preferred embodiment will be described using FIGS. 3 and 4. FIG. 3 is a block diagram of the electrical configuration of the electric fan system and FIG. 4 is a block diagram of the details of an electric fan driving circuit in FIG. 3.

As shown in FIG. 3, the electric fan system for a vehicle has an electric fan driving circuit 30 and an electronic engine control unit (E/G-ECU) 40. The electric fan driving circuit 30 has, as shown in FIG. 4, a controller 31, a brushed motor driver 32, and a brushless motor driver 33. The controller 31 has a brushless motor controller 31a, an energization logic generator circuit 31b, and a brushed motor controller 31c.

Here, the brushless motor controller 31a detects an actual position of the rotor 12b of the brushless motor 12 based on a detection output from a magnetic pole sensor 13 within the brushless motor 12. The actual position of the rotor 12b thus detected is hereinafter referred to as "detected position of the rotor 12b." The magnetic pole sensor 13 is constituted by three Hall elements and the magnetic pole sensor 13 is arranged around the rotor 12b within the brushless motor 12 to detect a change in magnetic field associated with rotation of the rotor 12b. Further, the rotor 12b is made from a permanent magnet and rotates the impeller 11 by the rotation thereof.

Further, the brushless motor controller 31a detects a target rotational speed of the brushless motor 12 as a control command value (brushless control command value), based on a duty ratio Ds of a pulse signal sent by the electronic engine control unit 40. The energization logic generator circuit 31b drives the brushless motor driver 33 to bring the actual rotational speed of the brushless motor 12 close to the target rotational speed on the basis of the detected position of the rotor 12b.

The brushless motor driver 33 is a known inverter circuit that is powered by a direct-current power supply Ba and controls the amount of three-phase AC power supplied to the stator coil 12a of the brushless motor 12. A three-phase full-wave bridge circuit is constituted by using six field-effect transistors U+, V+, W+, U−, V−, and W− therein.

The brushed motor controller 31c controls the brushed motor driver 32 in pulse-width-modulation (PWM) mode, according to a control signal (brushed motor control command value) from the electronic engine control unit 40. The brushed motor driver 33 is constituted by a single field-effect transistor and is powered by the direct-current power supply Ba to control the amount of power supplied to the brushed motor 22.

The electronic engine control unit 40 is composed of a microcomputer, memory, and the like, and controls the electric blowers 10, 20 via the electric fan driving circuit 30, on the basis of detection output from a temperature sensor 125 for detecting the temperature of cooling water for the driving engine 135 and detection output from a pressure sensor 130 for detecting a pressure of the refrigerant flowing within the condenser 110. The temperature sensor 125 detects the temperature of cooling water that flows out of the radiator 100 and returns to the water-cooled engine 135.

Figure 5:
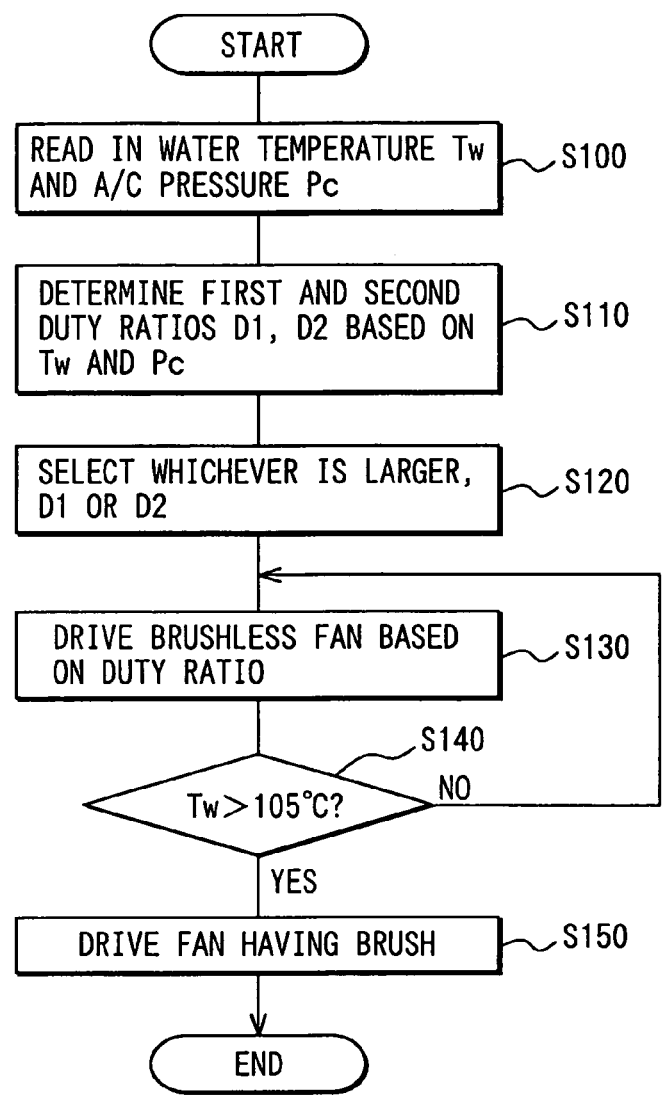
FIG. 5 is a flow chart of processing steps carried out by the electronic engine control unit of FIG. 1.

Next, operation of the present embodiment will be described using FIGS. 5 through 7. FIG. 5 is a flow chart of blower control processing by the electronic engine control unit 40. The electronic engine control unit 40 executes a computer program stored in the memory in accordance with the flow chart in FIG. 5. This computer program is repeatedly executed.

First, in step S100, the temperature of the cooling water (hereinafter referred to as "water temperature Tw") is read from the water temperature sensor and the pressure of the refrigerant Pc is also read from the pressure sensor 130. Next, in step S110, first and second duty ratios D1 and D2 of pulse signals for controlling the electric blower 10 are determined on the basis of the water temperature Tw, the pressure Pc, and characteristic graphs in FIGS. 6 and 7 which are stored in the memory in advance (S110).

Figure 6:
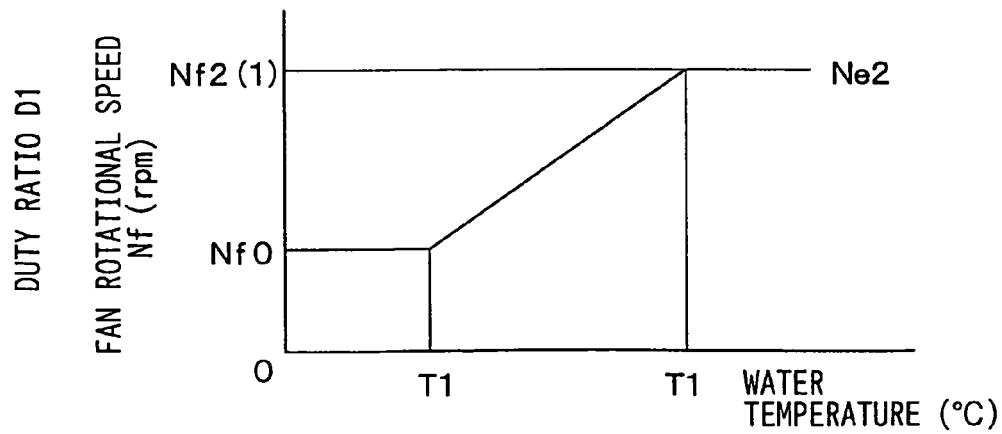
FIG. 6 is a graph of an operation of the electronic engine control unit of FIG. 1.
Figure 7:
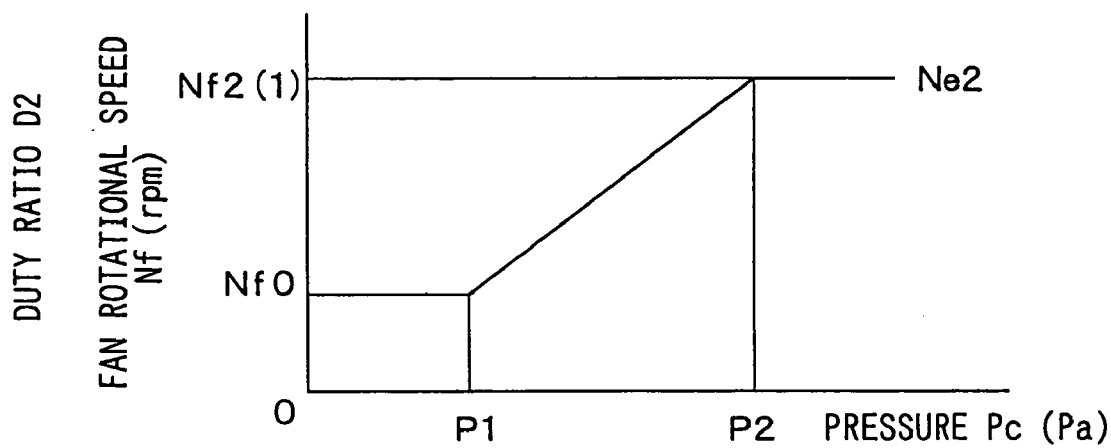
FIG. 7 is a graph of an operation of the electronic engine control unit of FIG. 1.
Figure 8:
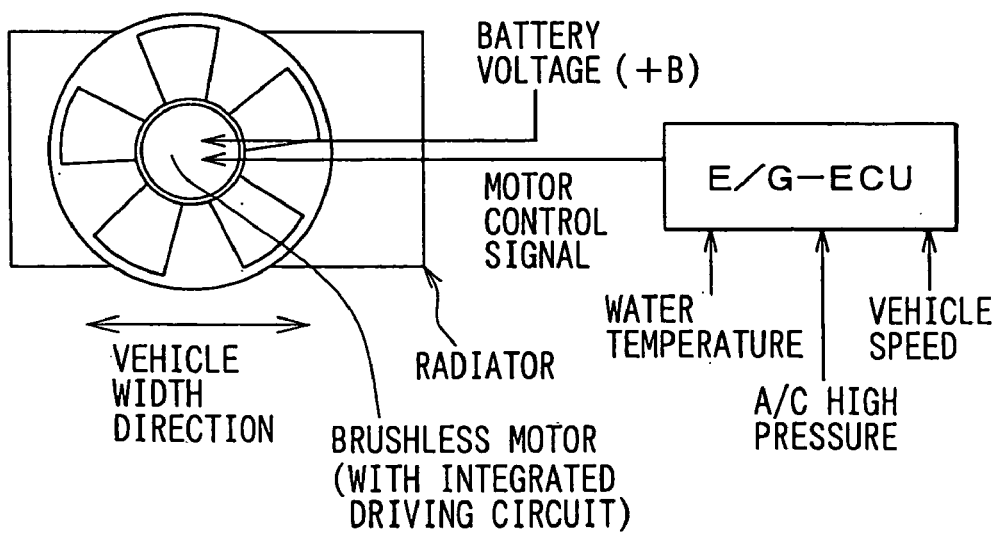
FIG. 8 is a schematic view of an electric fan system for a vehicle according to conventional technology.

Specifically, the first duty ratio D1 is determined, as shown in FIG. 6, such that it becomes a larger value along with the increase of the water temperature Tw in the range between the temperature T1 and the temperature T2 (>T1). The second duty ratio D2 is determined, as shown in FIG. 7, such that it becomes a larger value along with the increase of the pressure Pc in the range between the pressure P1 and the pressure P2 (>P1). Here, the first and second duty ratios D1 and D2 are values representing the rotational speed of the electric blower 10, or the amount of blown air.

Next, either the first duty ratio D1 determined based on the temperature of the cooling water or the second duty ratio D2 determined based on the pressure of the refrigerant, whichever is larger is selected (S120), and a pulse signal with the selected duty ratio Ds is output to the brushless motor controller 31a of the controller 31 of the electric fan driving circuit 30. Here, the brushless motor controller 31a detects a target rotational speed based on the duty ratio Ds of the pulse signal, and also detects a detected position of the rotor 12b based on a detection output from the magnetic pole sensor 13. The brushless motor controller 31a then generates a drive signal including the detected position of the rotor 12b and the target rotational speed and outputs the same to the energization logic generator circuit 31b.

Receiving this drive signal, the energization logic generator circuit 31b individually switches the transistors U+, V+, W+, U−, V−, and W− constituting the brushless motor driver 33 based on the drive signal from the brushless motor controller 31a to bring the actual rotational speed of the brushless motor 12 close to its target rotational speed. These transistors U+, V+, W+, U−, V−, and W−, upon being switched individually, supply the stator coil 12a with three-phase AC power. Further, among the transistors U+, V+, W+, U−, V−, and W−, the transistors U−, V−, and W− on the low potential side are controlled in PWM mode based on the control by the energizing logic generator circuit 31b.

As a result, the amount of three-phase AC power supplied to the stator coil 12a is controlled, and therefore the rotational speed of the rotor 12b and hence the rotational speed of the impeller 11 is controlled. This means that the rotational speed of the impeller 11 is controlled based on the duty ratio Ds of the pulse signal. In other words, the electric blower 10 is capable of distributing cooling air to the radiator 100 and condenser 110 in an amount determined according to the detection signals Tw and Pc.

Next, when it is determined that the temperature of the cooling water is equal to or more than T2 (105° C., for example), a pulse signal with a predetermined specified duty ratio is output to the brushed motor controller 31c of the controller 31 (S140 and S150). Upon receiving this pulse signal, the brushed motor controller 31c controls the brushed motor driver 32, whereby the brushed motor driver 33 rotationally drives the brushed motor 22 at a specified rotational speed. In this case, the electric blower 20 distributes a specified amount of cooling air to the radiator 100 and condenser 110. In this manner, the electric blower 20 is enabled to distribute cooling air to the radiator 100 and condenser 110, in cooperation with the electric blower 10.

Further, when determining that the water temperature Tw of cooling water is less than T2 based on the detected signal output from the temperature sensor, the electronic engine control unit 40 will not output a pulse signal to the brushed motor controller 31c of the controller 31 so that only the electric blower 10 distributes cooling air to the radiator 100 and the condenser 110.

The effects of the present embodiment will be described below.

According to the present embodiment, since the electric blower 20 is not activated unless-the temperature of the cooling water becomes T2 or higher, the operating rate of the brushed motor 22 (operating hours of the motor per specified period of time) is decreased, and hence wear and tear on the brushed motor 22 can be reduced. This means that the life of the brushed motor 22 can be increased, and therefore the life of the electric blower 20 and hence of the electric fan system for vehicles can be increased. Further, since the brushed motor 22 is used for the electric blower 20 although the brushless motor 12 is used for the electric blower 10, the construction of the electric fan driving circuit can be simplified and the cost increase can be suppressed in comparison with the case where the brushless motor 12 is employed for both the electric blowers 10 and 20.

(Second Embodiment)

In relation to the first embodiment described above, there has been disclosed an example in which the brushed motor 22 is activated in addition to the brushless motor 12 only when it is determined that the cooling water temperature is equal to or higher than a predetermined value. However, the present invention is not limited to this example, and it is also possible that the brushed motor 22 is activated in addition to the brushless motor 12 only when it is determined that the increased rate of the cooling water temperature is equal to or higher than a predetermined value.

Specifically, a second preferred embodiment relates to a vehicular electric fan system that distributes cooling air to a radiator 100 for cooling cooling water circulated in a vehicular water-cooled engine 135 and a condenser 110 for cooling a refrigerant circulated within an automobile air conditioner. The electric fan system has an electric blower 10 for distributing the cooling air to the radiator 100 and the condenser 110 by using a brushless motor 12, an electric blower 20 for distributing the cooling air to the radiator 100 and the condenser 110 by using a brushed motor 22, and an electronic engine control unit 40. The electronic control unit 40 activates only the electric blower 10 when it determines that the increasing rate of the temperature of the cooling water is less than a specified value. The electronic control unit 40 activates both of the electric blowers 10, 20 when it determines that the increasing rate of the temperature of the cooling water is equal to or more than the specified value, based on the detected output from a temperature sensor that detects the temperature of the cooling water.

Here, the increasing rate of the temperature is a value representing the amplitude of the temperature elevation (ΔH) (= temperature after measurement Ha−temperature before measurement Hb) per specified period of time during the elevation of the temperature.

Instead of this, the following constitution (1) or (2) may be adopted.

(1) In this constitution, the vehicular electric fan system distributes cooling air to a radiator 100 and a condenser 110. The cooling air cools the water circulated in a vehicle's water-cooled engine and the refrigerant circulated in the vehicle's air conditioner condenser 110. The electric fan system uses a brushless motor 12 within a first electric blower 10 and a brushed motor 22 within a second electric blower 20 for distributing the cooling air to the radiator 100 and the condenser 110. The electric fan system also uses an electronic engine control unit 40 to activate the electric blowers. The electronic engine control unit 40 activates only the electric blower 20 when the control unit 40 determines that the refrigerant pressure is less than a specified value, but activates both of the electric blowers 10, 20 when the control unit 40 determines that the refrigerant pressure is equal to or higher than the specified value. The specified value is based on the pressure detected and output from a pressure sensor 130 that detects the refrigerant pressure in the condenser 110.

(2) In this constitution, the vehicular electric fan system distributes cooling air to a radiator 100 and a condenser 110. The cooling air cools the water circulated in a vehicle's water-cooled engine and the refrigerant circulated in the vehicle's air conditioner condenser 110. The electric fan system uses a brushless motor 12 within a first electric blower 10 and a brushed motor 22 within a second electric blower 20 for distributing the cooling air to the radiator 100 and the condenser 110. The electric fan system also uses an electronic engine control unit 40 to activate the electric blowers. The electronic engine control unit 40 activates only the electric blower 10 when the control unit 40 determines that the increasing rate of the refrigerant pressure is less than a specified value, but activates both of the electric blowers 10, 20 when the control unit 40 determines that the increasing rate of the refrigerant pressure is equal to or higher than the specified value. The specified value is based on the pressure detected and output from a pressure sensor 130 that detects the refrigerant pressure in the condenser 110.

Here, the increasing rate of the pressure is a value representing the amplitude of the pressure increase (ΔP) (= pressure after measurement Pa−pressure before measurement Pb) per specified period of time during the increase of pressure.

In relation to the above-described embodiments, explanation has been made about an example of providing a single brushless motor 12 and a single brushed motor 22. However, the present invention is not limited to this, and two or more brushless motors 12 may be provided.

(Third Embodiment)

In relation to the above-described embodiments, explanation has been made about an example in which the brushed motor 22 is activated in addition to the brushless motor 12 when it is determined that the temperature of the cooling water (or the increase rate of the temperature) is equal to or higher than a predetermined value, or when it is determined that the refrigerant pressure (or the increase rate of the pressure) in the condenser is equal to or higher than a predetermined value. However, even under such conditions, the brushed motor 22 may remain inactive provided that the travel speed of the vehicle is equal to or higher than a predetermined speed.

Figure 9:
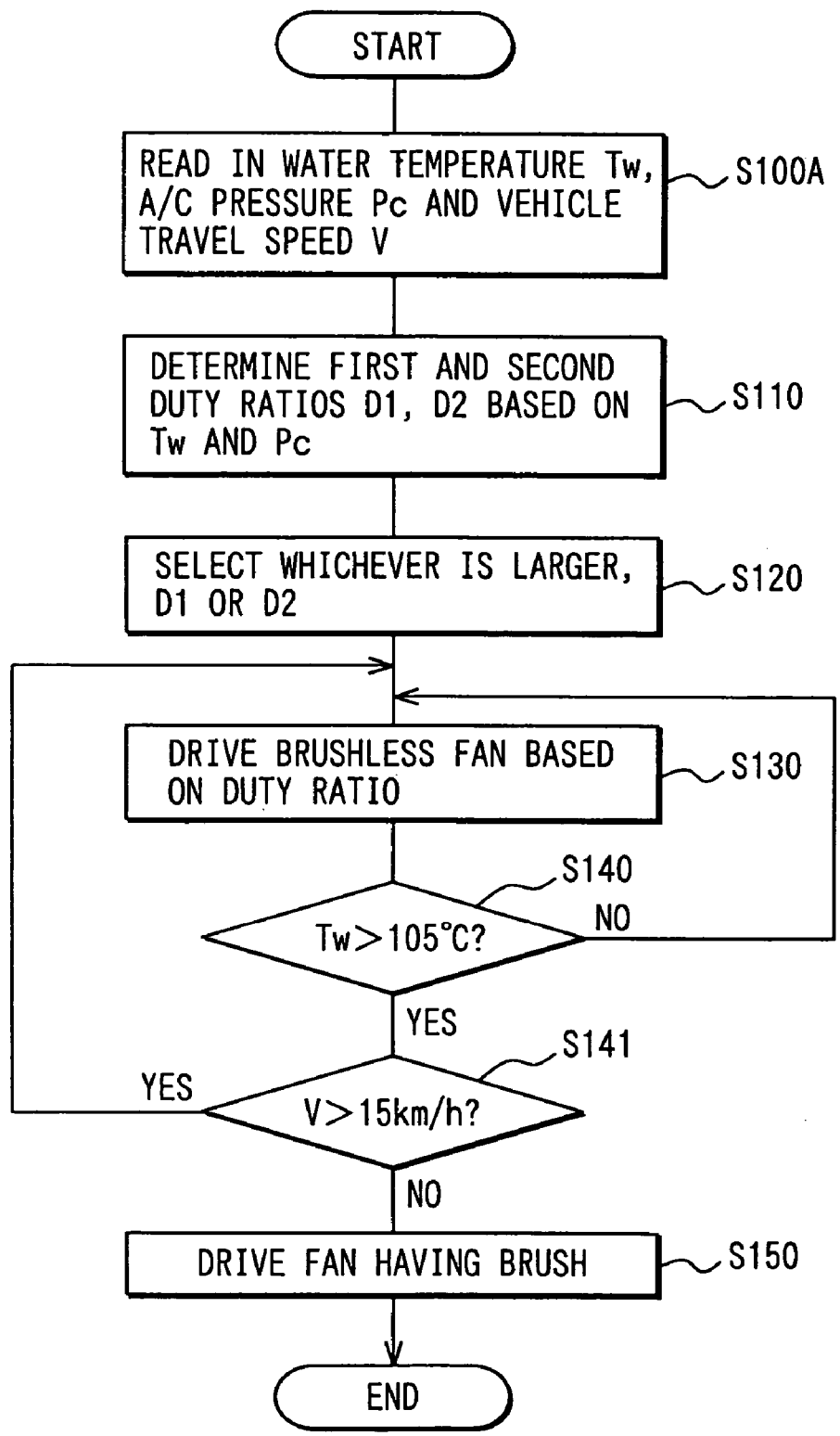
FIG. 9 is a flow chart of processing steps carried out by an electronic engine control unit according to another preferred embodiment.

Operation of this embodiment will now be described using FIG. 9. Note that like reference numerals are used for those operations that are similar to the first embodiment and therefore, detailed explanations that are repetitive will be omitted.

Specifically, in step S100A, a vehicle speed V detected by a vehicle speed sensor is read in in addition to the water temperature Tw and the pressure Pc. Next, the processing for determining a duty ratio (S110), processing for selecting a duty ratio (S120) and processing for driving the brushless fan (S130) are executed, and thereafter the procedure proceeds to step S140.

In step S140, when it is determined that the temperature of the cooling water is equal to or more than T2 (105° C., for example), the procedure proceeds to step S141. In step S141, when it is determined that the travel speed of the vehicle is less than 15 km, for example, a pulse signal with a predetermined specified duty ratio is output to the brushed motor controller 31c of the controller 31 (S150).

Receiving this signal, the brushed motor controller 31c controls the brushed motor driver 32, and the brushed motor driver 32 rotationally drives the brushed motor 22 at a specified rotational speed. In this case, the electric blower 20 distributes a specified amount of cooling air to the radiator 100 and the condenser 110. The electric blower 20 is thus enabled to distribute cooling air, in cooperation with the electric blower 10, to the radiator 100 and the condenser 110.

If it is determined in step S141 that the vehicle speed is 15 km/h or higher, no pulse signal is output to the brushed motor controller 31c of the controller 31 so that only the electric blower 10 distributes cooling air to the radiator 100 and the condenser 110.

According to the present embodiment, the radiator 100 and the condenser 110 can be cooled by air that is taken in by the movement of the vehicle if the vehicle speed is 15 km/h or higher, and a sufficient amount of cooling air can be ensured without operation of the brushed motor 22. Therefore, it is possible to further reduce wear and tear on the brushed motor 22 in comparison with the embodiments described above.

In relation to the above-described embodiments, explanation has been made about an example in which the brushed motor 22 is rotationally driven at a specified rotational speed when the cooling water temperature is T2 or higher. However, the present invention is not limited to this, and the rotational speed of the brushed motor 22 may be varied to change the amount of cooling air according to either the cooling water temperature or the refrigerant pressure in the condenser 110.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicular electric fan system comprising:
    a first electric blower that utilizes a brushless motor, wherein the first electric blower distributes cooling air to an exterior of a radiator containing cooling water and to a heat dissipater containing refrigerant circulated in a refrigeration cycle device;
    a second electric blower that utilizes a brushed motor, wherein the second electric blower distributes cooling air to the radiator and the heat dissipater;
    a temperature sensor for detecting a temperature of the cooling water; and
    a control unit, wherein
    the control unit activates only the first electric blower when the control unit determines that the temperature of the cooling water is less than a predetermined value, and
    the control unit activates both the first and second electric blowers when the control unit determines that the temperature of the cooling water is equal to or greater than the predetermined value.

2. The electric fan system for a vehicle according to claim 1, wherein
    the control unit activates only the first electric blower when the control unit determines that the temperature of the cooling water detected by the temperature sensor is equal to or more than the predetermined value, and that a vehicle speed detected by a vehicle speed sensor is equal to or more than a specified value.

3. A vehicular electric fan system comprising:
    a first electric blower that utilizes a brushless motor, wherein the first electric blower distributes cooling air to an exterior of a radiator containing cooling water and to a heat dissipater containing refrigerant circulated in a refrigeration cycle device;
    a second electric blower that utilizes a brushed motor, wherein the second electric blower distributes cooling air to the radiator and the heat dissipater;
    a temperature sensor for detecting a temperature of the cooling water; and
    a control unit, wherein
    the control unit activates only the first electric blower when the control unit determines that an increasing rate of the temperature of the cooling water is less than a predetermined value, and
    the control unit activates both the first and second electric blowers when the control unit determines that the increasing rate of the temperature of the cooling water is equal to or greater than the predetermined value.

4. An electric fan system for a vehicle, for distributing cooling air to a radiator for cooling cooling water circulated in a vehicle-driving water-cooled engine and to a heat dissipater for cooling a refrigerant circulated in a refrigeration cycle device, the fan system comprising:
    a first electric blower for distributing the cooling air to the radiator and the heat dissipater (110) by using a brushless motor;
    a second electric blower for distributing the cooling air to the radiator and the heat dissipater by using a brushed motor; and
    a control unit that activates only the first electric blower when the control unit judges that a pressure of the refrigerant is less than a predetermined value, and activates both the first and second electric blowers when the control unit judges that the pressure of the refrigerant in the heat dissipater is equal to or more than the predetermined value, the pressure based on output from a pressure sensor for detecting the pressure of the refrigerant in the heat dissipater.

5. The electric fan system for vehicles according to claim 4, wherein
    the control unit activates only the first electric blower when the control unit judges that the pressure of the refrigerant in the heat dissipater is equal to or more than the predetermined value, and that a vehicle speed detected by a vehicle speed sensor is equal to or more than a specified value.

6. An electric fan system for a vehicle, for distributing cooling air to a radiator for cooling cooling water circulated in a vehicle-driving water-cooled engine and to a heat dissipater for cooling a refrigerant circulated in a refrigeration cycle device, characterized by comprising:

a first electric blower for distributing the cooling air to the radiator and the heat dissipater by using a brushless motor;

a second electric blower for distributing the cooling air to the radiator and the heat dissipater by using a brushed motor; and a control unit that activates only the first electric blower when it judges that an increasing rate of a pressure of the refrigerant is less than a predetermined value, and that activates both the first and second electric blowers when it judges that the increasing rate of the pressure of the refrigerant in the heat dissipater is equal to or more than the predetermined value, the increasing rate of pressure based on output from a pressure sensor for detecting the pressure of the refrigerant in the heat dissipater.

* * * * *